Figure 1:
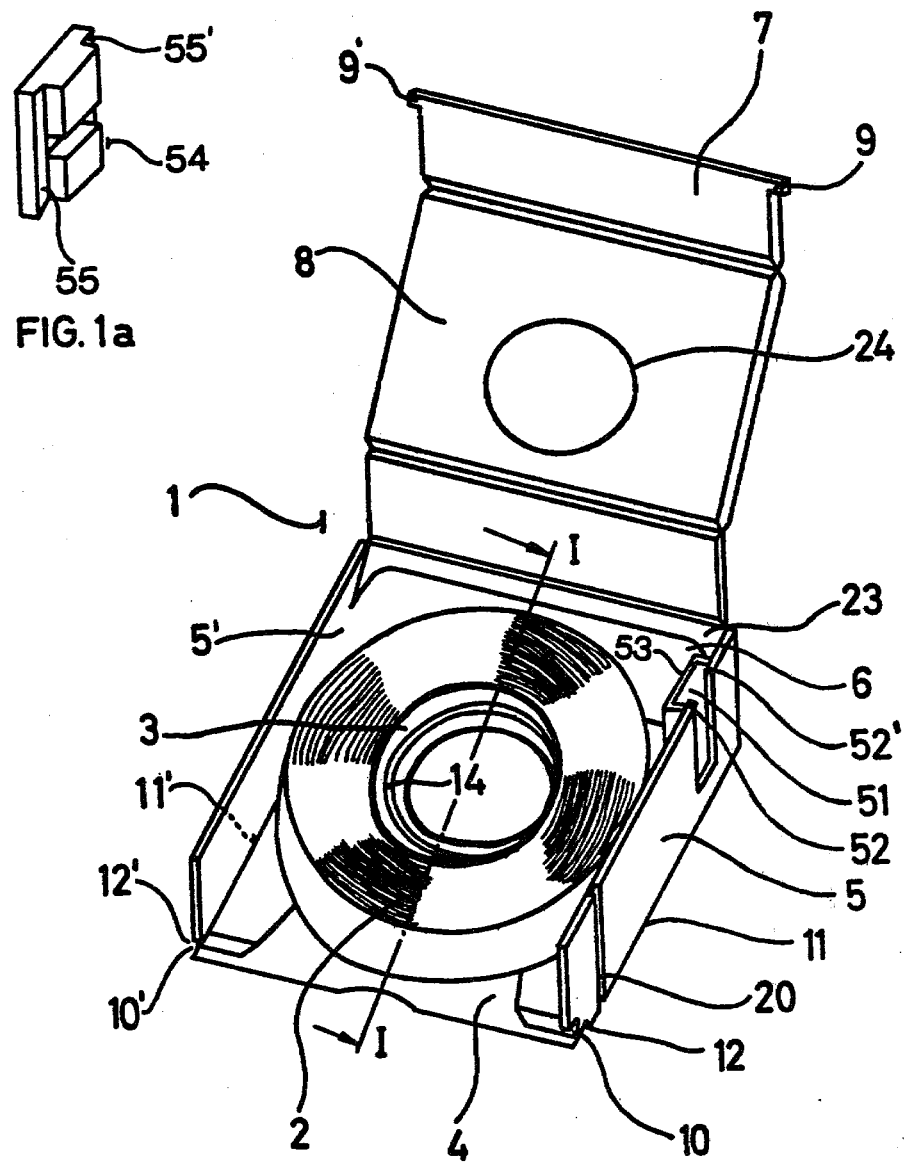

United States Patent [19]

Schoettle et al.

[11] 4,347,537
[45] Aug. 31, 1982

[54] TAPE CARTRIDGE ASSEMBLY AND TAPE TRANSPORT APPARATUS FOR USE THEREWITH

[75] Inventors: Klaus Schoettle, Heidelberg; Peter Dobler, Ludwigshafen; Lothar Gliniorz, Frankenthal; Werner Hoffmann, Ludwigshafen, all of Fed. Rep. of Germany

[73] Assignee: BASF Aktiengesellschaft, Ludwigshafen, Fed. Rep. of Germany

[21] Appl. No.: 125,036

[22] Filed: Feb. 27, 1980

[30] Foreign Application Priority Data

Mar. 29, 1979 [DE] Fed. Rep. of Germany ....... 2912423

[51] Int. Cl.³ .............................................. G11B 23/02
[52] U.S. Cl. .................................... 360/132; 242/197
[58] Field of Search .................. 360/132, 93; 242/197

[56] References Cited

U.S. PATENT DOCUMENTS

| | | | |
|---|---|---|---|
| 3,333,687 | 8/1967 | Badgett . | |
| 3,334,831 | 8/1967 | Bradt | 242/55.13 |
| 3,706,979 | 12/1972 | Tagawa et al. | 360/132 |
| 3,807,651 | 4/1974 | Furst | 242/192 |
| 3,857,531 | 12/1974 | Jantzen | 360/132 |
| 3,987,489 | 10/1976 | Schoettle et al. | 360/132 |
| 4,014,042 | 3/1977 | Schoettle et al. | 360/132 |
| 4,023,748 | 5/1977 | Burdorf et al. | 242/192 |
| 4,056,245 | 11/1977 | Schoettle et al. | 360/132 |

OTHER PUBLICATIONS

Johnson et al., "Small Cartridge for Videotext", IBM Tech. Disc. Bul., vol. 9, No. 10, 3/67, p. 1397.

*Primary Examiner*—Stuart N. Hecker
*Attorney, Agent, or Firm*—Keil & Witherspoon

[57] ABSTRACT

A tape cartridge assembly and tape transport apparatus for use therewith, comprising a cartridge housing which is provided internally with holding means for a hub bearing a roll of magnetic tape, the roll of tape being accessible from outside, receiving means for the cartridge housing and the hub being provided on the apparatus, by which means the peripheral surface of the roll of magnetic tape can be brought into contact with a drive member.

14 Claims, 8 Drawing Figures

TAPE CARTRIDGE ASSEMBLY AND TAPE TRANSPORT APPARATUS FOR USE THEREWITH

The present invention relates to a tape cartridge assembly, containing one roll of tape, for use with a tape transport apparatus in which a tape-driving capstan engages the peripheral surface of the roll of tape.

U.S. Pat. No. 3,987,489 discloses a cartridge which comprises two parts of about equal size which can be locked together and are hingedly connected to one another, and which possesses at least one aperture for the admission of a shaft, associated with the tape transport apparatus, for the roll of tape. In addition, holding means for the roll of tape are provided in the cartridge. A locking device in the cartridge cooperates with releasing means on the transport apparatus, so that an actuating device can open the cartridge. Thereafter, the roll of tape is completely free and can be brought into contact with the capstan.

In the embodiments described in this U.S. patent, the locking device consists of a spring of special shape, which cooperates with projections on the cartridge parts. In order to keep the roll of tape together, the latter—when the cartridge is in the closed position—is in contact, over part of its peripheral surface, with spring members, specially provided for the purpose, as holding means.

The cartridge-receiving member on the apparatus is also split and can, by means of a pivoting mechanism, be swung apart conjointly with the parts of the cartridge.

When the cartridge is in the open state, i.e. in the operational state, the space it takes up is substantially greater than the space it occupies in the closed state. A further disadvantage is that the cartridge is of relatively complicated design and must be assembled from a large number of individual components. It can therefore not be manufactured economically. As far as the tape transport apparatus is concerned, an elaborate actuating mechanism for the cartridge is needed.

It is an object of the present invention to provide a magnetic tape cartridge and an apparatus for use therewith, both of which are of simple design and troublefree in operation. The space requirements of the cartridge should furthermore conform to the small space available inside a compact tape transport apparatus.

We have found that this object is achieved, according to the invention, by a tape cartridge assembly for use with a tape transport apparatus having a tape-driving capstan, a spindle mounted for rotation and also for movement transversely to its axis toward the said capstan, and cartridge-receiving means, the said tape cartridge assembly comprising:

a housing with lower, upper and side, front and rear walls, said upper wall and either one of said side walls or the front or rear wall having an aperture therein,
a flangeless hub having an opening for access, through said aperture in the upper wall, by said spindle,
a roll of tape wound on said hub,
holding means within said housing which hold the roll of tape, and
means for disengaging the roll of tape from the holding means to permit said roll of tape to be moved by displacement of said spindle toward said capstan for engagement, through said aperture in said side, front or rear wall, with the peripheral surface of said roll of tape while said cartridge is retained by said receiving means.

The cartridge according to the invention is distinguished particularly by its simplicity; similarly to the manufacture of a folding box from a single blank, the cartridge housing, including all auxiliary members, can be formed from a single part. In addition to this advantage in respect of the method of manufacture, the compact and handy shape of the cartridge is a striking feature. The roll of magnetic tape is held in the cartridge without coming into contact with any parts thereof.

The devices on the tape transport apparatus are of correspondingly simple design. In particular, no opening and closing mechanism for the cartridge is needed and the cartridge-receiving means themselves do not comprise any movable parts, apart from optional snap means. In the simplest case, the actuating mechanism by means of which the roll of magnetic tape is brought into its operating position merely consists of a driven displaceable actuating member which engages the pivotable hub-receiving means.

Figure 2:
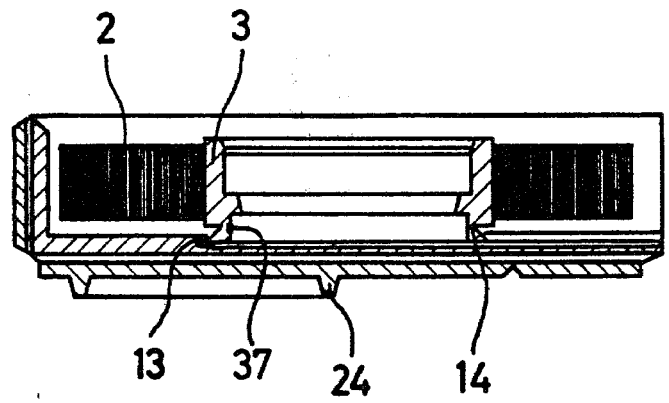
Figure 3:
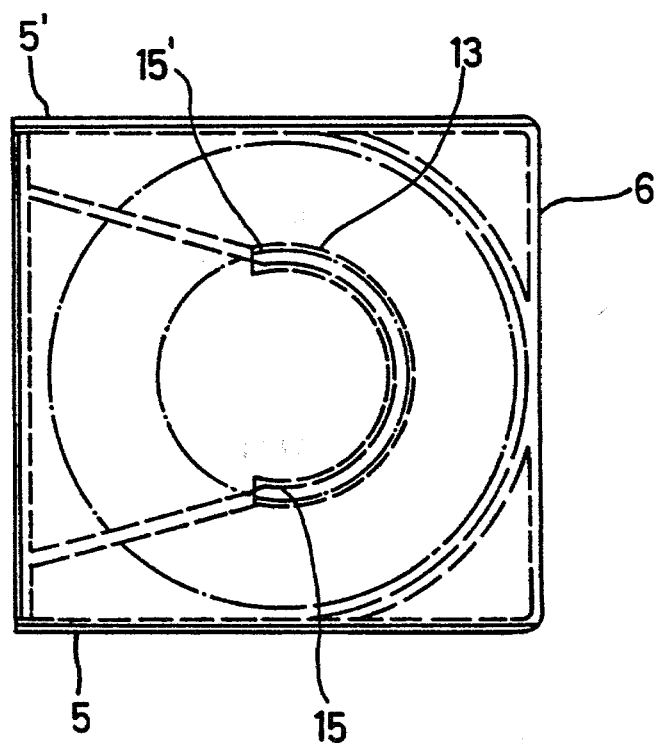
Figure 4:
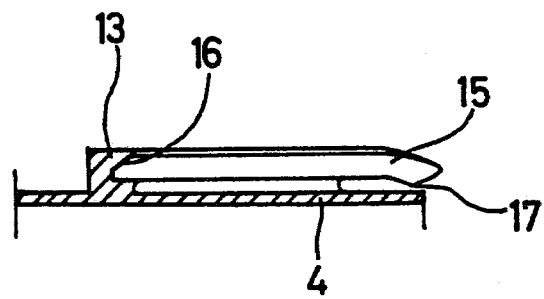
Figure 4A:
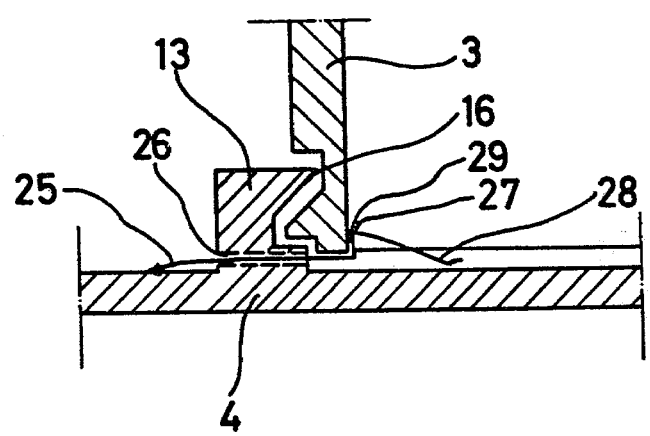
Figure 5:
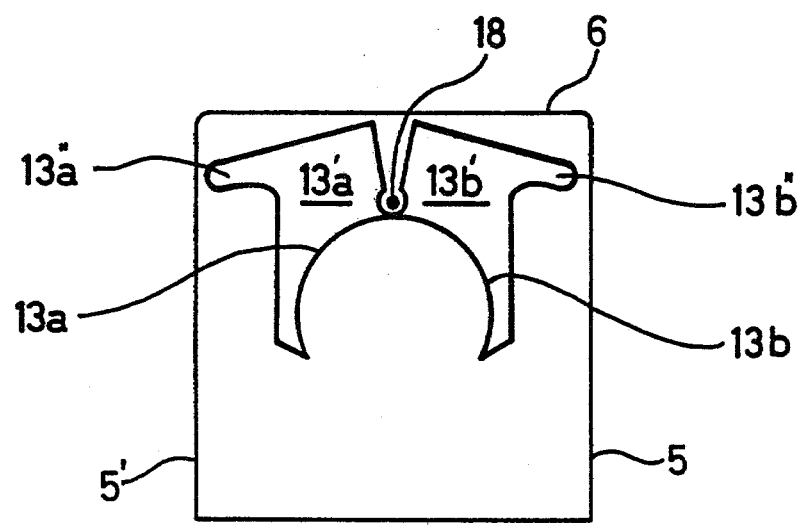
Figure 6:
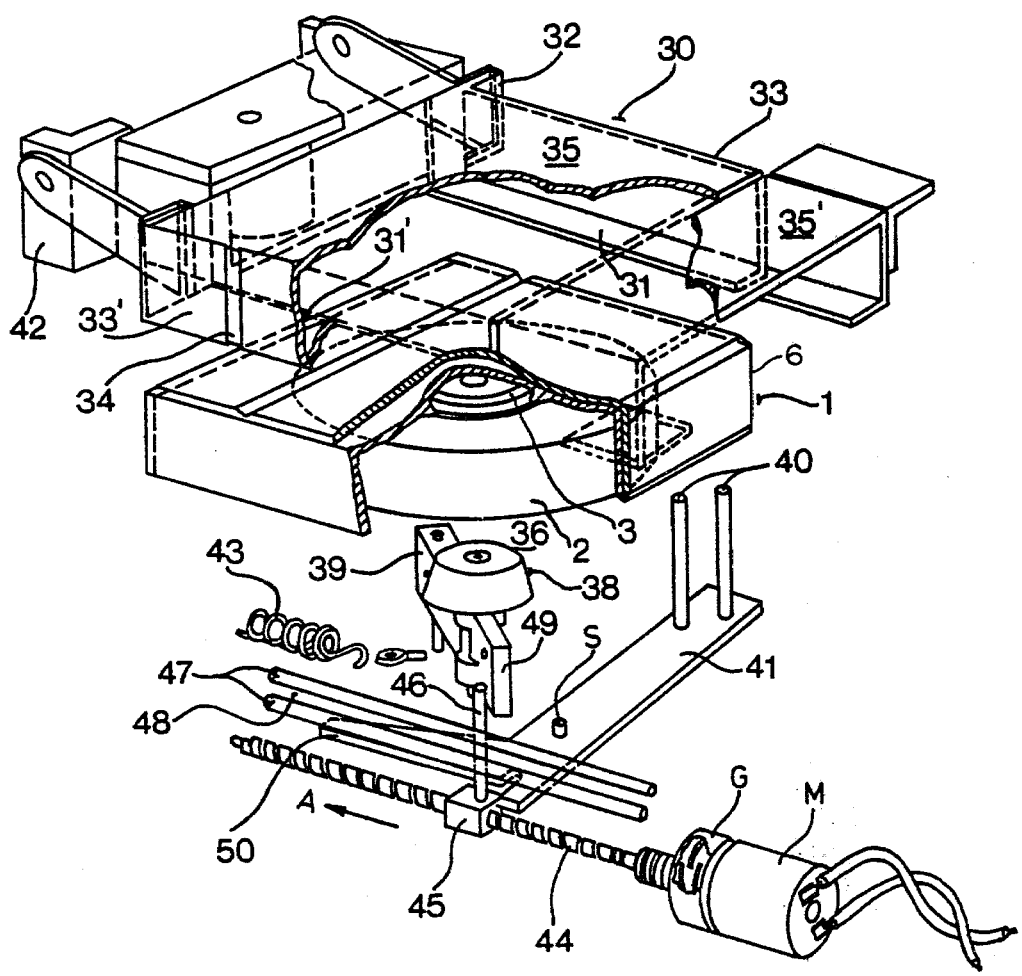

Further details of the invention are disclosed in the following description of the embodiments illustrated in the accompanying drawings, in which FIG. 1 is a schematic perspective view of the cartridge in the open state, FIG. 1a is a schematic perspective view of a record inhibit plug, FIG. 2 is a schematic cross-sectional view of the opened-up cartridge, taken along line I—I of FIG. 1, FIG. 3 shows holding and locking means, provided in the cartridge, for the roll of magnetic tape, FIG. 4 is a schematic cross-sectional view of the holding and locking means, taken along line I—I in FIG. 1, FIG. 4a is an enlarged cross-sectional view of a hub-locking means comprising an actuatable leaf spring, taken along line I—I in FIG. 1, FIG. 5 shows pivotable hub-locking means, and FIG. 6 is a perspective, exploded view of cartridge-receiving means on the tape transport apparatus.

FIG. 1 shows the opened cartridge housing 1, with the roll 2 of magnetic tape, carried on a hub 3.

The cartridge housing 1 comprises a bottom 4, two opposite side walls 5, 5', a rear wall 6 and a front wall 7 as well as a lid 8 which shuts off the interior of the housing. The two side walls and the rear all are rigidly attached to the bottom and to one another, whilst the front wall is hingedly joined to the lid, in the closed position of which lateral projections 9, 9' on the front wall engage corresponding recesses 10, 10' in the front edges of the side walls to form a releasable connection. The lid 8 is provided with a hinge, arranged parallel to the hinge connecting the rear wall and the lid, at a distance equivalent to the height of the rear wall. As a result of these design features, it is possible to fold the lid, together with the front wall 7, after the latter has been released from the side walls 5, 5' and the bottom 4, backwards about the rear wall 6, so that it comes to rest against the outer surface of the bottom. Consequently, the cartridge, in the open state for operation in the apparatus, does not take up more space than the closed cartridge. It is advantageous to detachably interconnect the two surfaces which come into contact with one another. Examples of suitable means of connection are adhesive coatings provided on one or more of the surfaces or conventional snap-fit connections, such as studs on the one hand and recesses on the other. In a simple embodiment, the side walls 5, 5' project slightly beyond the bottom face, forming flanges 11, 11', between which the lid 8 can be clamped. It has proved particularly advantageous to also use the projections 9, 9', present on the front wall 7, for effecting this connection; for this purpose, the front ends of the flanges are provided with recesses 12, 12' which cooperate with these projections.

The hinge connections on the cartridge housing 1 are preferably in the form of integral hinges. The entire cartridge housing can then be produced in one part, for example by injection-molding of a plastic. Suitable methods of manufacture are well-known in plastics processing technology and therefore do not require further description here.

To hold and lock the roll 2 of magnetic tape in the cartridge housing 1, the bottom 4 of the cartridge is provided, on its inner surface, with a semi-circular web 13 which is open toward the front wall 7 (FIGS. 2 and 3) and has an undercut at a slight distance above the bottom. Of course, undercuts having other shapes can also be used. The web can be molded integrally with the cartridge housing, but can also be subsequently machined out of the bottom. The hub 3, provided with an annular groove 14 matching the undercut, is pushed into the web 13, so that the groove and undercut rim engage, and is thus held in the cartridge housing.

The ends of the web 13 are provided with tongue-like springy cantilevered extensions 15, 15' which constrict the aperture between the ends of the web (FIG. 4). When the hub 3 is pushed into and out of the web 13, this constriction is overcome as a result of the extensions 15, 15' moving back resiliently under the pressure of the hub. After the hub 3 has been pushed home, the extensions 15, 15' spring back again and exercise a clamping action on the hub, so that the latter is releasably locked in the web 13. At the same time, the annular groove 14 in the hub 3 is pressed into the undercut web 13 with a force which produces sufficient friction to prevent rotation of the roll 2 of magnetic tape in the cartridge housing 1.

In order to facilitate the introduction of the hub 3 into the web 13, the extensions 15, 15' are divergent. The locking action exercized on the hub can be increased by means of dome-shaped projections 17 on the underside of the extensions 15, 15'.

In another embodiment of the cartridge (FIG. 4a), locking of the hub 3 held in the undercut web 13 can also be achieved by providing, on the bottom 4 of the cartridge housing 1, between the rear wall 6 and the web, a leaf spring 25 whose free end extends past the undercut 16 through a hole 26 in the web, along the center line of the cartridge, running parallel to the side walls 5, 5'. At this point, i.e. in front of the undercut 16, the spring 25 is provided with a cam-like projection 27 which, when viewed in the direction in which the roll 2 of magnetic tape is pushed into the cartridge, possesses an inclined surface 28 followed by a descending step 29. The arrangement and height of the projection 27 on the spring 25 is so chosen that, when the hub 3 is pushed into the undercut web 13, it depresses the spring, and, after the hub has reached its final position, the spring jumps back again and thereby engages, with its step 29, the inner peripheral surface of the hub so as to lock it in the said position. The hub is released from the web 13 with the aid of the hub-receiving member on the apparatus, which member, when the cartridge is inserted in the apparatus, enters the hub and in doing so engages with its flat circular end the projection 27 on the spring 25 and presses the latter down against the bottom of the cartridge. The height of the spring above the bottom, in the non-stressed state, can be determined by selecting an appropriate height for the hole 26 in the web.

Of course, movement of the spring for releasing the hub can also be effecting by actuating members on the apparatus, for example by pins, which, when the cartridge is moved to its operating position in the apparatus, engage the spring between the web 13 and the rear wall 6.

The leaf spring may be made of any conventional spring material. Plastics may also be used. The latter have the advantage that, when the cartridge housing is injection-molded, the spring can be directly molded onto the bottom. If a metal spring is used, it is preferably fastened to the housing by welding it into the plastic constituting the bottom of the cartridge. Of course, other fixing means, such as rivets, screws and the like, may also be used.

It is also self-evident that a spring of appropriate design can also be attached inside the semi-circle formed by the web 13. In that case, the hole 26 in the web 13 can be omitted.

In the case of tape transport apparatus where the hub carrying the roll of magnetic tape cannot be pushed into or out of the cartridge housing or can only be displaced therein to a slight extent whilst the cartridge is in the apparatus, as will be discussed in more detail later, the above-described web 13 can be replaced by two arms 13a, 13b of the same size which are molded onto, or machined from, two flat members 13'a, 13'b which are hingedly connected to one another (FIG. 5). The two flat members each have a projection 13"a, 13"b, extending toward the side walls 5, 5', for cooperation with apparatus-associated actuating means, and are pivotally held in the cartridge housing 1 by means of a common pin 18 fixed to the bottom 4 of the cartridge. The hub 3, carrying the roll 2 of magnetic tape, is released by moving the two arms apart. A spring, in the form of a wire spring or a leaf spring for instance, not shown in the drawing, is anchored, at its two ends, in the flat members 13'a, 13'b in such a way that a prestressed, free span is formed between the flat members, which draws the arms 13a, 13b into the annular groove 14 in the hub and thereby locks the latter in the cartridge housing.

In an advantageous embodiment, the two flat members and arms are produced as a single plastic injection molding and the hinge is formed by a thin connecting web.

When the cartridge is inserted in the tape transport apparatus, it is advantageous for the cartridge to snap into its end position. For this purpose, recesses 20 are provided on the outside of the side walls 5, 5', which cooperate with spring-loaded members on the apparatus. Such snap means are of a conventional type and will therefore not be described in more detail here. One of the spring-loaded members can additionally be connected to a switch to indicate that the cartridge has been connected to the apparatus, ready for operation, and/or to trigger additional functions. To prevent the cartridge being inserted the wrong way round into the apparatus, the recesses 20 are arranged asymmetrically, or alternatively only one recess is provided. Another way of preventing incorrect insertion is to appropriately shape the cartridge, for example to make it rectangular in shape.

A recess 51 for accommodating a plug 54 for preventing inadvertent erasure of recordings on the magnetic tape, as a result of re-recording, is provided in one of the side walls 5, 5' of the cartridge housing 1; this recess possesses projections 52, 52' and the upper edge of its approximately U-shaped portion 53, which enters the interior of the cartridge, is set back below the upper edge of the side wall by an amount equal to the thickness of the lid 8. The record inhibit mode can be activated by inserting into recess 51 plug 54 which is shown schematically in FIG. 1a and can be made of plastic or metal for instance. It is guided by the projections at surfaces 55, 55' and can be retained in the recess 51 by conventional clamping means, for example dome-shaped or stud-like projections.

Contact between the lid 8 and the roll of magnetic tape could result in damage to the edge of the tape and thus cause disturbances during recording or playback. To prevent such contact, projections 23 are provided on the inside of the rear wall 6 and of the side walls 5, 5', which projections support the hinged parts of the lid. Furthermore, it is advantageous to provide, on the inside of the lid 8, a circular protrusion 24 which bears against the hub 3 when the cartridge is closed. Said circular protrusion can of course be replaced by one or more appropriately shaped and arranged protrusions.

FIG. 6 shows receiving means for the cartridge described above, together with the loading mechanism of a tape transport apparatus having a capstan which cooperates with the peripheral surface of the tape roll. The other functional components of the apparatus are of a conventional type and are therefore described below, and shown in the drawings, only to the extent that they cooperate with the cartridge-receiving means.

A pivotally mounted frame 30, serving as cartridge-receiving means, is provided laterally with inwardly-projecting cartridge-supporting members 31, 13'. The opened cartridge 1 is pushed manually into this frame, which has been swing up out of the apparatus, with the open cartridge front leading and with the roll 2 of magnetic tape facing downward toward the apparatus. Stops or a stop bar 32 at the end of the members 31, 31' ensure(s) precise positioning of the cartridge. In the event that the cartridge must be held firmly in this position during operation, the side parts 33, 33' of the frame 30 are providing with snap means 34 which enter the recesses 20, provided for this purpose, in the side walls 5, 5' of the cartridge. Above the space for accommodating the cartridge, the frame 30 is covered by a plate 35 which forms part of the apparatus housing 35' and, when the frame has been fully depressed, forms a flat surface with the housing.

When the frame 30 is depressed, the hub 3 for the roll of magnetic tape is pressed onto the hub-receiving member 36, an additional annular groove 37 in the inner peripheral surface of the hub being engaged by the ball-catch mechanism 38 of the hub-receiving member. A catch of a type conventionally used in cassette recorders is provided for the frame 30 which is spring-loaded so that it swings open automatically when the catch is released for removal of the cartridge.

The hub-receiving member 36 is rotatably mounted on a support which can be moved toward and away from the capstan, the support forming part of a conventional tape transport apparatus, for example as proposed in U.S. Pat. No. 3,921,933. For the sake of simplification, only the support in the form of a pivotable arm 39 is shown.

When the cartridge in the frame swings down into the apparatus, its rear wall 6 arrives between two pins 40 on a pivoting lever 41, which has a lateral projection and is mounted on a pivot S on the chassis 42 of the apparatus. Below the pivoting lever, a threaded spindle 44, which can be driven by a motor M via gearing G, is mounted in bearing members (not shown) on the chassis, and a follower member 45, provided with two styli which cooperate with the thread on the spindle, is movable along the spindle. The follower member is provided with a post 46 which is guided in a gap 48 formed between two rails 47 and running parallel to the threaded spindle 44. The post 46 forms an actuating element which on the one hand engages the end 49 of the arm 39 and on the other hand is slidable along surface 50 on the pivoting lever 41, the shape of the said surface determining the manner of movement of the pivoting lever. When the motor M is activated, the threaded spindle 44 moves the follower member, carrying the post 46, in the direction of arrow A, so that the arm 39, bearing the hub-receiving member 36, can move, under the pull of a spring 43, in the direction of the capstan. At the same time, the pivoting lever 41 executes a movement in the opposite direction, by virtue of the post 46 sliding along the surface 50, and in doing so causes one of the pins 40 mounted thereon to move the cartridge housing 1 to the rear. After this movement has been completed, the hub 3 is completely detached from the web 13 of the cartridge, and the roll 2 of magnetic tape is pressed up against the capstan and is thus in its operating position. As a result of dividing the displacing motion, required to release the hub 3, into two separate movements in opposite directions, the travel of the support for the hub-receiving member can be kept small.

As a result of the cartridge being displaced, part of the cartridge housing 1 attains a position under the wall of the apparatus housing 35', so that the plate 35 is additionally held in position above the cartridge after the frame 30 has been fully depressed.

It is possible to dispense with displacement of the cartridge housing, and hence to dispense with the pivoting lever 41, if a correspondingly greater travel of the arm 39 is acceptable. The pivoting lever can also be omitted if, in the embodiment described above, a cartridge having a hub-locking spring as shown in FIG. 4a is used.

The requirement that the travel of the arm 39 should also be as small as possible in the case of a stationary cartridge housing, can be met by a cartridge which is provided with pivotable hub-locking means as shown in FIG. 5. The necessary features of the apparatus are not shown in the drawings. They consist in that the pivoting lever 41, instead of being connected to the pins 40, is hingedly connected to the middle of a bar, the hinge being on a level with the line of symmetry of the cartridge. The two ends of the bar are each provided with a pin, which pins can engage the projections 13''a and 13''b on the pivotable locking means 13a, 13b; 13'a, 13'b of the cartridge.

Transfer of the cartridge from the operating position to the unloaded position, so that the cartridge can be taken out of the apparatus, takes place in the reverse sequence to the procedure described above for bringing the cartridge into the operating position.

We claim:

1. A tape cartridge, in particular a magnetic tape cassette, comprising a housing having a bottom wall, a top wall, two side walls and front and rear walls, and in said housing at least one roll of tape wound on a hub, wherein the side walls and the rear wall are rigidly attached to the bottom wall, the front wall is releasably connected to the bottom of the side walls and the top wall is a lid which is hingedly connected to the rear wall and the front wall and is foldable into two lid portions, such that the lid, together with the front wall can be folded about an edge of the rear wall against the outer surface of the bottom wall;

wherein the surfaces coming into contact after the folding operation possess releasable connecting means, and wherein locking means acting on the hub are provided to hold said tape roll(s) in the cartridge housing.

2. A tape cartridge as claimed in claim 1, wherein the cartridge housing is in one part and the hinges are integral hinges.

3. A tape cartridge as claimed in claim 1, wherein the means of connecting the surfaces which come into contact when the lid has been folded back comprise lateral projections on the surface of the bottom, between which projections the lid can be clamped.

4. A tape cartridge as claimed in claim 1, wherein the means of connecting the surfaces which come into contact comprise an adhesive coating applied to at least one of said surfaces.

5. A tape cartridge as claimed in claim 1, wherein the means of connecting the surfaces which come into contact comprise snap-fit connections including studs on the one hand and corresponding recesses on the other.

6. A tape cartridge as claimed in claim 1, wherein the releasable connections between the front wall on the one hand and the bottom of the side walls, on the other hand, are in the form of snap-fit connections including projections and recesses.

7. A tape cartridge as claimed in claim 1, wherein the means on the front wall, forming part of the releasable connections, include means for connecting the front wall, on the one hand, to the bottom of the side walls, on the other, and to connect the surfaces which come into contact when the cartridge is in the opened state.

8. A tape cartridge as claimed in claim 1, wherein a semi-circular web serving as hub-holding means is provided on the cartridge bottom, the web being undercut, and said hub which carries the roll of magnetic tape having an annular groove matching the undercut such that said hub can be pushed into the web and held therein.

9. A tape cartridge as claimed in claim 8, wherein the distance between the ends of the web, corresponding to the diameter of the semi-circular web, is slightly reduced by springy divergent extensions located at the web ends, so that the hub can be introduced more easily into the web and is locked after having passed through the constriction created by said extensions.

10. A tape cartridge as claimed in claim 8, wherein a leaf spring having a cam-like projection extends from the bottom of the cartridge housing into the semi-circular space enclosed by the web, so that the cam-like projection engages that part of the inner peripheral surface of the hub inside the cartridge housing, which is nearest to the cartridge rear wall, and thereby holds the hub firmly in the undercut web.

11. A tape cartridge as claimed in claim 8, wherein the hub-holding means comprises two parts of equal size, hingedly connected to one another, which are pivotally mounted on the cartridge bottom and are normally held in a closed position in which the hub is locked, and wherein there are provided projections on said two parts which, when engaged from outside the cartridge, pivot said two parts into an open position in which the hub is released.

12. A tape cartridge as claimed in claim 1, wherein the lid of the cartridge is provided with at least one protrusion which bears against the hub.

13. A tape cartridge as claimed in claim 1, wherein at least one of the side walls of the cartridge is provided with a recess for the purpose of locking the cartridge in position.

14. A tape cartridge assembly for use with a tape transport apparatus having a tape-driving capstan, a spindle mounted for rotation and also for movement transversely to its axis toward said capstan, and cartridge-receiving means, said tape cartridge assembly comprising:

a housing with bottom and top faces and with peripheral faces including two side faces and front and rear faces, and with means including walls for closing said faces in the non-operative condition of the cartridge, and said housing, in the operative condition of the cartridge, providing an aperture at its top face and also an aperture at one of its peripheral faces, a flangeless hub having an opening for access, through the first-mentioned aperture, by said spindle, a roll of tape wound on said hub, locking means within said housing which hold the roll of tape, and means for disengaging the roll of tape from the locking means to permit said roll of tape to be moved by a displacement of said spindle toward said capstan for engagement, through said second-mentioned aperture, with the peripheral surface of said roll of tape while said cartridge is retained by said receiving means, wherein the two side walls and the rear wall are rigidly attached to the bottom wall, the front wall is releasably connected to the bottom and the side walls and the top wall is a lid which is hingedly connected to the rear wall and the front wall and is foldable into two lid portions such that the lid, together with the front wall, can be folded about an edge of the rear wall against the outer surface of the bottom wall, the surfaces coming into contact after the folding operation, possessing releasable connecting means, and said locking means having elements acting on the hub to hold the roll of magnetic tape in the cartridge housing, and wherein on the apparatus there are provided a hub receiving member for carrying and driving the hub and roll of magnetic tape, said hub receiving member possessing releasable hub-catching means, said cartridge-receiving means being movable toward the hub-receiving member during loading, and an actuating device for effecting a relative movement between the hub-receiving member and the cartridge and simultaneously causing release of the hub from its locking means in the cartridge and producing contact between the roll of magnetic tape and the capstan.

* * * * *